United States Patent Office 2,927,109
Patented Mar. 1, 1960

2,927,109

3-DEOXY-11,17-OXYGENATED-ANDROSTANES

John C. Babcock, Portage, Mich., assignor to The Upjohn Company, Kalamazoo, Mich., a corporation of Delaware No Drawing. Application July 31, 1959
Serial No. 830,722

23 Claims. (Cl. 260—239.55)

The new compounds and the processes of the present invention are illustratively represented by the following formulae:

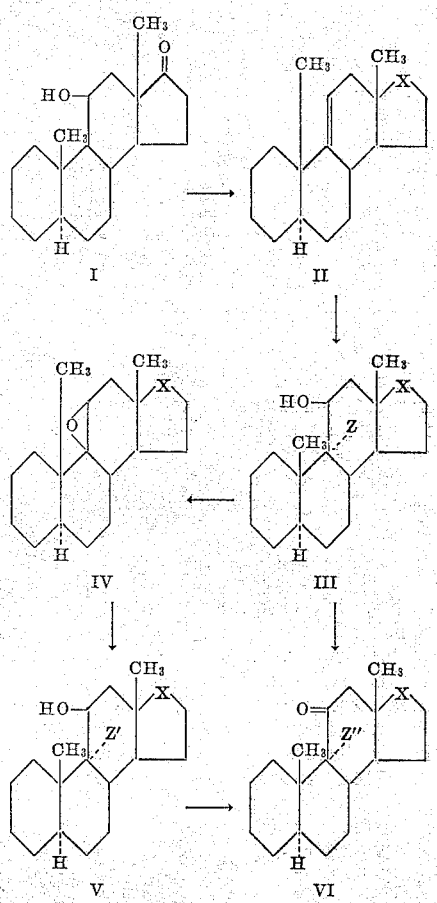

wherein X is selected from the group consisting of the carbonyl radical (>C=O), the β-hydroxymethylene radical

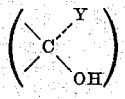

and the lower-acyloxy methylene radical

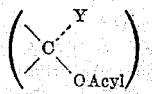

and the acyl radical is that of a hydrocarbon carboxylic acid containing from one to twelve carbon atoms, inclusive, Y is selected from the group consisting of hydrogen and a lower hydrocarbon radical including methyl, ethyl, propyl, ethinyl, propinyl, 2-methylpropenyl and the like; Z is a halogen having an atomic weight from 79 to 127, inclusive, i.e., bromine or iodine, Z' is a halogen having an atomic weight from 19 to 36, inclusive, i.e., fluorine or chlorine, and Z" is a halogen having an atomic weight from 19 to 127, inclusive, i.e., fluorine, chlorine, bromine or iodine.

The novel compounds of this invention are useful in the treatment of humans and other mammals as oral and parenteral anabolic agents of improved therapeutic ratio and as progestational agents. They also affect the secretion of gonadotropins and thus regulate ovulation and endometreal and placental development and, particularly when used in conjunction with estrogens, e.g., ethinylestradiol and/or androgens, e.g., Halotestin (9α-fluoro-11β-hydroxy-17-methyltestosterone) reduce fertility, and are useful in the treatment of dysmenorrhea, amenorrhea, endometriosis, threatened abortion and related gynecological disorders. The compounds of this invention in addition have central nervous system depressing activity. The compounds can be administered in conventional dosage forms such as pills, tablets, and capsules for oral use or in conventional liquid forms as are used with natural and synthetic steroid hormones for injection.

The starting material for this invention, 11β-hydroxyandrostan-17-one (I), can be prepared in accordance with the procedure disclosed in applicant's U.S. Patent 2,881,188.

The process of the present invention comprises: treating 11β-hydroxyandrostan-17-one (I) with a hypohalous acid (used per se or produced from a N-haloamide or N-haloimide in situ) and then with sulfur dioxide to obtain 17-keto-9(11)-androstene (II); treating the 17-keto-9(11)-androstene (II) with an alkylating agent such as methyl magnesium bromide to produce 17β-hydroxy-17α-methyl-9(11)-androstene (IIb); treating the 17β-hydroxy-17α-methyl-9(11)-androstene (IIb) with a hypohalous acid such as hypochlorous, hypobromous or hypoiodous acid to give 9α-halo-11β,17β-dihydroxy-17α-methylandrostane (III); treating the 9α-halo-11β,17β-dihydroxy-17α-methylandrostane (III) with an alkali such as sodium hydroxide to obtain 9,11β-epoxy-17α-methyl-17β-hydroxyandrostane (IV); treating the 9,11β-epoxy-17α-methyl-17β-hydroxyandrostane (IV) with hydrochloric or hydrofluoric acid or other hydrogen halide releasing agent to yield 9α-halo-11β,17β-dihydroxy-17α-methylandrostane (V) and treating the 9α-halo-11β,17β-dihydroxy-17α-methylandrostane (V) with an oxidizing agent such as chromic acid to obtain 9α-halo-11-keto-17α-methyl-17β-hydroxyandrostane (VI). 9α-halo-11-keto-17α-methyl-17β-hydroxyandrostane (VI) can also be produced by treating 9α-halo-11β,17β-dihydroxy-17-methylandrostane (III) with an oxidizing agent such as chromic acid. This brief description of the methods employed in the production of the compounds of Formula VI from (I) is only illustrative of the process which is more broadly disclosed in the examples.

The following examples are illustrative of the products and processes of this invention, but are not to be construed as limiting.

EXAMPLE 1

*17-keto-9(11)-androstene (II)*

A solution of 5 g. of 11β-hydroxyandrostan-17-one (I) (prepared in the manner disclosed in applicant's U.S. Patent 2,881,188) dissolved in 25 ml. of pyridine was stirred with 3 g. of N-bromoacetamide for a period of 5 minutes with cooling. The mixture was saturated with sulfur dioxide gas until the orange color faded. It was then diluted with water and yielded 5 g. of colorless solid with a positive Beilstein test. The product was allowed to react overnight with 5 g. of zinc dust in 25 ml. of acetic acid. The crude product was diluted with water and chromatographed over Florisil synthetic magnesium silicate. Elution with 1% acetone in petroleum ether yielded 1.26 g. of 17-keto-9(11)-androstene with a melting point of 134 to 135° C. and an $[\alpha]_D$ of $+142°$ (chloroform). (Elution with 2% acetone in petroleum ether gave 1.86 g. of unreacted starting material.)

Analysis.—Calcd. for $C_{19}H_{28}O_2$: C, 83.77; H, 10.36. Found: C, 83.52; H, 10.41.

EXAMPLE 2

17β-hydroxy-9(11)-androstene (IIa)

A solution prepared from 0.3 g. of 17-keto-9(11)-androstene (II) in 4 ml. of methanol was reduced with 0.15 g. of sodium borohydride in 1 ml. of methanol containing 2 drops of 10% sodium hydroxide. The product (IIa) separated during the reaction and had a melting point of 162 to 165° C. and an $[\alpha]_D$ of $+9°$ (chloroform).

Analysis.—Calcd. for $C_{19}H_{30}O$: C, 83.15; H, 11.02. Found: C, 82.80; H, 11.05.

A solution of 17β-hydroxy-9(11)-androstene (IIa) in dry pyridine was heated with acetic anhydride under reflux until esterification was complete to yield 17β-hydroxy-9(11)-androstene 17-acetate. Similarly, 17β-hydroxy-9-(11)-androstene is converted to other 17β-hydroxy-9(11)-androstene 17-acylates by esterification of the 17-hydroxy group, e.g., by reaction with the appropriate acid anhydride, acid chloride or bromide, ester by ester exchange, acid in the presence of esterification catalyst, etc. Examples of 17β-hydroxy-9(11)-androstene 17-acylates prepared include those wherein the acyl group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, or other hydrocarbon carboxylic acids containing from one to twelve carbon atoms, inclusive, e.g., cyclopropylidenacetic, cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2,6-, 3,4-, and 3,5-dimethylbenzoic, ethylbenzoic, 2,4,6-trimethylbenzoic, α - naphthoic, 3 - methyl - α - naphthoic, phenylacetic, phenylpropionic, etc.

EXAMPLE 3

17β-hydroxy-17α-methyl-9(11)-androstene (IIb)

A solution of 17-keto-9(11)-androstene (II) in benzene was added during a period of about one-half hour to a solution of methyl magnesium bromide in ether. The resulting mixture was stirred under nitrogen for about 8 hours, then cooled and decomposed with saturated ammonium chloride. Following dilution with ether and standing overnight the mixture was filtered. The filter cake was washed with ether then taken up in hydrochloric acid and extracted with ether. The combined ether extracts were pooled, washed with water, dried and evaporated to yield 17β-hydroxy-17α-methyl-9(11)-androstene, a crystalline solid.

A solution of 17β-hydroxy-17α-methyl-9(11)-androstene (IIb) in dry pyridine was heated with acetic anhydride under reflux until esterification was complete to yield 17β-hydroxy-17α-methyl-9(11)-androstene 17-acetate. Similarly, 17β - hydroxy - 17α - methyl - 9(11)-androstene is converted to other 17-acylates in addition to the acetate by esterification of the 17-hydroxy group, e.g., by reaction with the appropriate acid anhydride, acid chloride, ester by ester exchange, acid in the presence of an esterification catalyst, etc. Examples of esters that can be thus prepared include those named in the paragraph following Example 2.

EXAMPLE 4

17β-hydroxy-17α-ethinyl-9(11)-androstene (IIc)

A solution of 17-keto-9(11)-androstene (II) in dimethylsulfoxide was added to a solution of sodium acetylide in dimethylsulfoxide. After stirring the reaction mixture for about 15 hours at room temperature, ice was added and the mixture diluted with cold water. The resulting precipitate was washed with water, dried and purified by recrystallization to give 17β-hydroxy-17α-ethinyl-9(11)-androstene, a crystalline solid.

EXAMPLE 5

9α-bromo-11β, 17β-dihydroxy-17-methylandrostane (III)

To a solution of 17β-hydroxy-17α-methyl-9(11)-androstene (IIb) in acetone at about 15° C., N-bromoacetamide dissolved in water was added dropwise, with stirring. A dilute solution of perchloric acid was then slowly added at the same temperature. After about twenty minutes, there was added a sufficient amount of a saturated aqueous solution of sodium sulfite to discharge the yellow color of the solution. The resulting mixture was then diluted with water thereby precipitating 9α-bromo - 11β, 17β - dihydroxy - 17 - methylandrostane.

Similarly, esters of 17β-hydroxy-17-methyl-9(11)-androstane, e.g., an ester named in the paragraph following Example 2, preferably the acetate, are similarly converted to esters of 9α-bromo-11β, 17β-dihydroxy-17-methylandrostane.

Reacting 9α - bromo - 11β, 17β - dihydroxy - 17-methylandrostane or a 17-ester thereof named above, with sodium iodide in acetone, according to techniques known in the art, is productive of 9α-iodo-11β, 17β-dihydroxy-17-methylandrostane or a 17-ester thereof.

9α - bromo - 11β, 17β - dihydroxy - 17 - ethylandrostane and esters thereof are similarly prepared by substituting 17β-hydroxy-17-ethyl-9(11)-androstene and esters thereof, respectively, as the starting steroid in the reaction described in Example 5.

Following the procedure of Example 5, but substituting 9(11)-androsten-17-one as the starting steroid, yields 9α-bromo-11β-hydroxyandrostan-17-one.

In the reaction of Example 5, the N-bromoacetamide produces hypobromous acid in situ. Other N-bromoamides and N-bromoimides may be used or a solution of hypobromous acid per se may be used.

EXAMPLE 6

9,11β-epoxy-17α-methyl-17β-hydroxyandrostane (IV)

A solution of 9α-bromo-11β,17β-dihydroxy-17α-methylandrostane (III) in methanol, was titrated with dilute aqueous sodium hydroxide. The resulting mixture was diluted with water and then chilled to about zero degrees centigrade thereby precipitating 9,11β-epoxy-17α-methyl-17β-hydroxy-androstane.

Following the procedure of Example 6, but substituting 9α-bromo-11β-hydroxyandrostan-17-one as the starting steroid, yields 9,11β-epoxyandrostan-17-one.

In the same manner as described in Example 6, 17-esters of 9α-bromo-11β,17β-dihydroxy-17-methylandrostane, e. g., 9α-bromo-11β-hydroxy-17-methyltestosterone 17-acylates wherein the acyl radical is that of an acid named in the paragraph following Example 2 are converted to 17-esters of 9,11β-epoxy-17-methyl-17β-hydroxyandrostane.

9,11β-epoxy-17-methyl-17β-hydroxyandrostane and 17-esters thereof are also prepared by substituting 9α-iodo-11β,17β-dihydroxy - 17 - methylandrostane and 17 - esters thereof, respectively, as the starting steroid in the reaction described in Example 6.

9,11β-epoxy-17α-ethyl-17β-hydroxy and 17-esters thereof are similarly prepared by substituting 9α-bromo-11β, 17β-dihydroxy-17-ethylandrostane and 17-esters thereof as the starting steroid in the reaction described in Example 6.

EXAMPLE 7

9α-fluoro-11β,17β-dihydroxy-17-methylandrostane (V)

Add a cooled solution of 9,11β-epoxy-17-methyl-17β-hydroxyandrostane (IV) in methylene chloride to a large excess of anhydrous hydrogen fluoride in methylene chloride containing tetrahydrofuran. The mixture is stored at —15° C. for about five hours and then cautiously poured with stirring into an aqueous solution of sodium carbonate containing ice. The layers are separated and the aqueous layer is extracted with methylene chloride. The combined methylene chloride solution is washed with water and then dried. The solvent is distilled from the dried solution and the residue crystallized from methylene chloride-Skellysolve B hexanes to give 9α-fluoro-11β,17β-dihydroxy-17-methylandrostane.

9α-fluoro-11β,17β-dihydroxy-17-ethylandrostane is prepared by substituting 9,11β-epoxy-17-ethylandrostane as the starting steroid in Example 7.

Following the procedure of Example 7, but substituting 9,11β-epoxyandrostane-17-one as the starting steroid, yields 9α-fluoro-11β-hydroxyandrostan-17-one.

9α - fluoro - 11β,17β - dihydroxy - 17 - methylandrostane dissolved in glacial acetic acid and a small amount of water is converted to 9α-fluoro-11-keto-17β-hydroxy-17-methylandrostane by reaction with chromic acid. 9α-fluoro-11β-hydroxyandrostan-17-one is converted in the same manner to the corresponding 11-keto compound by reaction with chromic acid.

EXAMPLE 8

*9α-fluoro-11β-hydroxy-17α-methyl-17β-hydroxyandrostane 17-acetate (V)*

Following the procedure of Example 7, but substituting 9,11β - epoxy - 17α - methyl - 17β - hydroxyandrostane 17-acetate as the starting steroid, there is thus produced 9α - fluoro - 11β,17β - dihydroxy - 17 - methylandrostane 17-acetate.

Following the procedure described in Example 8, but substituting as starting steroid another 17-carboxylic acid ester of 9,11β-epoxy-17α-methyl-17β-hydroxyandrostane, e.g., a 9,11β-epoxy-17α-methyl-17β-hydroxyandrostane 17-acylate wherein the acyl radical is that of an acid named in the paragraph following Example 2, there is thus produced other 17-esters of 9α-fluoro-11β,17β-dihydroxy-17-methylandrostane, e.g., 9α-fluoro-11β,17β-dihydroxy - 17 - methylandrostane 17 - acylates wherein the acyl radical is that of a hydrocarbon carboxylic acid containing from one to twelve carbon atoms, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2-, 3-, or 4-methylbenzoic, 2,3-, 2,4-, 2,5-, 2,6-, 3,4-, and 3,5-dimethylbenzoic ethylbenzoic, 2,4,6-trimethylbenzoic, α-naphthoic, 3-methyl-α-naphthoic, an aralkyl acid, e.g., phenylacetic, phenylpropionic, etc.

Similarly, 9α - fluoro - 11β,17β - dihydroxy - 17α-ethylandrostane 17-acylates are prepared by substituting a 9,11β-epoxy-17α-ethyl-17β-hydroxyandrostane, 17-acylate, e.g., wherein the acyl radical is that of an acid named in the paragraph following Example 8, as the starting steroid in the reaction of Example 8.

EXAMPLE 9

*9α-chloro-11β-hydroxy-17α-methyl-17β-hydroxyandrostane*

Following the procedure of Example 7, but substituting anhydrous hydrogen chloride for the hydrogen fluoride, there is thus produced 9α-chloro-11β,17β-dihydroxy-17-methylandrostane.

Similarly, 17-esters, e.g., 9α-chloro-11β,17β-dihydroxy-17α-methylandrostane 17-acylates wherein the acyl radical is that of an acid named in the paragraph following Example 2, are produced by substituting a 9,11β-epoxy-17α-methyl-17β-hydroxyandrostane 17-acylate, e.g., wherein the acyl radical is that of an acid named in the paragraph following Example 2, as the starting steroid in the reaction described in Example 9.

Following the procedure of Example 9, but substituting as starting steroid 9,11β-epoxy-17α-ethyl-17α-hydroxyandrostane or a 9,11β-epoxy-17α-ethyl-17β-hydroxyandrostane 17-acylate wherein the acyl radical is, for example, that of an acid named in the paragraph following Example 2, there is thus produced 9α-chloro-11β,17β-dihydroxy-17α-ethylandrostane and 9α-chloro-11β,17β-dihydroxy-17α-ethylandrostane 17-acylates.

The 9α-chloro- and 9α-fluoro-11β-hydroxy-17-alkyltestosterone 17-acylates named above are also prepared by esterification of the corresponding free 17-hydroxy compounds in the manner described in the paragraph following Example 2.

EXAMPLE 10

*9α-fluoro-11-keto-17α-methyl-17β-hydroxyandrostane (VI)*

To a solution of 9α-fluoro-11β,17β-dihydroxy-17α-methylandrostane (V) in glacial acetic acid was added a solution of chromium trioxide and water in acetic acid. The mixture was maintained at room temperature for several hours and then methanol was added to destroy excess chromium trioxide. Water was added to produce a precipitate which was filtered, washed with water and then dried to give 9α-fluoro-11-keto-17α-methyl-17β-hydroxyandrostane, a crystalline solid.

Following the procedure of Example 10, but substituting 9α-fluoro-11β-hydroxyandrostan-17-one as the starting steroid, yields 9α-fluoro-11,17-diketoandrostane.

Following the procedure described in Example 10, but substituting as starting steroid a 9α-fluoro-11β,17β-dihydroxy-17α-methylandrostane 17-acylate named in the paragraph following Example 2, there is thus-produced esters of 9α-fluoro-11-keto-17α-methyl-17β-hydroxyandrostane, e.g., 9α-fluoro-11-keto-17α-methyl-17β-hydroxyandrostane 17-acylates wherein the acyl radical is, for example, that of an acid named in the paragraph following Example 2.

Similarly, substituting 9α-chloro-11β,17β-dihydroxy-17α-methylandrostane as the starting steroid in the reaction described in Example 10, there is thus produced 9α-chloro-11-keto-17α-methyl-17β-hydroxyandrostane.

Substituting 9α - fluoro - 11β,17β - dihydroxy - 17α-ethylandrostane or 9α-fluoro-11β-hydroxy-17α-ethylandrostane 17-acylates wherein the acyl radical is, for example, that of an acid named in the paragraph following Example 2 as the starting steroid in Example 10, there is thus produced 9α-fluoro-11-keto-17α-ethyl-17β-hydroxyandrostane and 9α-fluoro-11-keto-17α-ethyl-17β-hydroxyandrostane 17-acylates. The 9α-chloro-11-keto-17α-ethyl-17β-hydroxyandrostane and 17-acylates thereof are similarly prepared from the corresponding 9α-chloro-11β-hydroxy compounds.

EXAMPLE 11

*9α-bromo-11-keto-17α-methyl-17β-hydroxyandrostane*

Following the procedure of Example 10, but substituting 9α - bromo-11β,17β-dihydroxy-17α-methylandrostane (III) or 9α-iodo-11β,17β-dihydroxy-17-methylandrostane as the starting steroid, there is thus produced 9α-bromo-11-keto-17α-methyl-17β-hydroxyandrostane or 9α-iodo-11-keto-17α-methyl-17β-hydroxyandrostane.

EXAMPLE 12

*9α-bromo-11β,17β-dihydroxyandrostane (III)*

Following the procedure of Example 5, but substituting 17β-hydroxy-9(11)-androstene 17-acetate (Example 2) as the starting steroid, there is thus produced 9α-bromo-11β,17β-dihydroxyandrostane 17-acetate. Other 17-acylates of 17β-hydroxy-9(11)-androstene including those 17-acylates listed and prepared as in the paragraph following Example 2, are similarly converted to 17-acylates of 9α-bromo-11β,17β-dihydroxyandrostane. 9α-bromo-11β,17β-dihydroxyandrostane is then produced by hydrolysis of the 17-acylates, preferably the acetate, with a dilute solution of hydrobromic acid in methanol.

Reacting 9α-bromo-11β,17β-dihydroxyandrostane or a 17-acylate thereof named in the paragraph following Example 2, with sodium iodide in acetone, according to techniques known in the art, is productive of 9α-iodo-11β,17β-dihydroxyandrostane or a 17-acylate thereof named in the paragraph following Example 2.

EXAMPLE 13

*9,11β-epoxy-17β-hydroxyandrostane (IV)*

Following the procedure of Example 6, but substituting 9α-bromo-11β,17β-dihydroxyandrostane as the starting steroid, there is thus produced 9,11β-epoxy-17β-hydroxyandrostane.

The 17-acylates of 9,11β-epoxy-17β-hydroxyandrostane are prepared by refluxing a solution of a 9α-bromo-11β,17β-dihydroxyandrostane 17-acylate in methanol containing sodium acetate for 6 to 24 hours. After addition of water, the product is collected by filtration, washed with water and dried to give a 9,11β-epoxy-17β-hydroxyandrostane 17-acylate.

In the same manner as described in Example 6, 17-esters of 9α-bromo-11β,17β-dihydroxyandrostane, e.g., 9α-bromo-11β,17β-dihydroxyandrostane 17-acylates wherein the acyl radical is that of an acid named in the paragraph following Example 2, are converted to 17-esters of 9,11β-epoxy-17β-hydroxyandrostane.

9,11β-epoxy-17β-hydroxyandrostane and 17-carboxylic acid esters thereof are also prepared by substituting 9α-iodo-11β,17β-dihydroxyandrostane and 17-carboxylic acid esters thereof as the starting steroid in the reaction described in Example 6.

EXAMPLE 14

*9α-fluoro-11β,17β-dihydroxyandrostane (V)*

Following the procedure of Example 7, but substituting 9,11β-epoxy-17β-hydroxyandrostane as the starting steroid, there is thus produced 9α-fluoro-11β,17β-dihydroxyandrostane.

EXAMPLE 15

*9α-fluoro-11β,17β-dihydroxyandrostane 17-acetate*

Following the procedure of Example 7, but substituting 9,11β-epoxy-17β-hydroxyandrostane 17-acetate as the starting steroid, there is thus produced 9α-fluoro-11β,17β-dihydroxyandrostane 17-acetate.

Other 17-acylates of 9α-fluoro-11β,17β-dihydroxyandrostane including those 17-acylates listed and prepared as in the paragraph following Example 2 are similarly converted to 17-acylates of 9α-fluoro-11β,17β-dihydroxyandrostane.

EXAMPLE 16

*9α-chloro-11β,17β-dihydroxyandrostane*

Following the procedure of Example 7, but substituting anhydrous hydrogen chloride for the hydrogen fluoride, there is thus produced 9α-chloro-11β,17β-dihydroxyandrostane.

Similarly, 17-acylates, e.g., 9α-chloro-11β,17β-dihydroxyandrostane 17-acylates wherein the acyl radical is that of an acid named in the paragraph following Example 2, are produced by substituting a 9,11β-epoxy-17β-hydroxyandrostane 17-acylate, e.g., wherein the acyl radical is that of an acid named in the paragraph following Example 2, as the starting steroid in the reaction described in Example 9.

EXAMPLE 17

*9α-fluoro-11-keto-17β-hydroxyandrostane (VI)*

To a solution of 9α-fluoro-11β,17β-dihydroxyandrostane 17-acetate (Example 15) in acetic acid is added chromium trioxide in glacial acetic acid and a small amount of water. The mixture is maintained at room temperature for a period of about 16 hours and then diluted with water. The resulting precipitate is recrystallized from methanol-water to give 9α-fluoro-11-keto-17β-hydroxyandrostane 17-acetate.

Following the procedure of Example 17, but substituting as starting steroid a 9α-fluoro-11β,17β-dihydroxyandrostane 17-acylate wherein the acyl radical is that of an acid named in the paragraph following Example 2, there is thus produced a 9α-fluoro-11-keto-17β-hydroxyandrostane 17-acylate wherein the acyl radical is that of an acid named in the paragraph following Example 2.

Similarly, 9α-chloro-11β,17β-dihydroxyandrostane 17-acylates can be converted to the corresponding 9α-chloro-11-keto-17β-hydroxyandrostane 17-acylates.

Saponification of 9α-fluoro-11-keto-17β-hydroxyandrostane 17-acetate with a molar equivalent excess of sodium bicarbonate, sodium hydroxide, or hydrochloric acid in a mixture of methanol and water is productive of 9α-fluoro-11-keto-17β-hydroxyandrostane.

Saponification in a similar manner of other 9α-fluoro-11-keto-17β-hydroxyandrostane 17-acylates also yields 9α-fluoro-11-keto-17β-hydroxyandrostane.

Similarly, 9α-chloro-11-keto-17β-hydroxyandrostane 17-acylates can be converted to 9α-chloro-11-keto-17β-hydroxyandrostane.

It is to be understood that the invention is not to be limited to the exact details of operation or exact compounds shown and described as obvious modifications and equivalents will be apparent to one skilled in the art, and the invention is therefore to be limited only by the scope of the appended claims.

I claim:

1. 9(11)-androstene of the following formula:

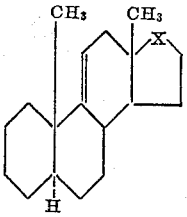

wherein X is selected from the group consisting of the carbonyl radical (>C=O), the β-hydroxymethylene radical

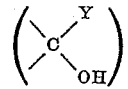

and the lower-acyloxy methylene radical

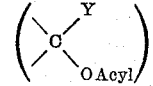

and the acyl radical is that of a hydrocarbon carboxylic acid containing from one to twelve carbon atoms, inclusive, and Y is selected from the group consisting of hydrogen and a lower hydrocarbon radical.

2. 17-ketto-9(11)-androstene of the following formula:

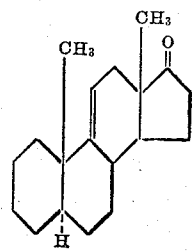

3. A member of the group consisting of 17β-hydroxy-9(11)-androstene of the following formula:

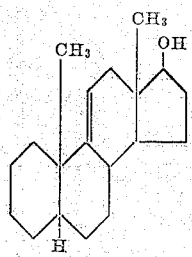

and the 17-acylates thereof wherein the acyl radical is that of a hydrocarbon carboxylic acid containing from one to twelve carbon atoms, inclusive.

4. 17β-hydroxy-9(11)-androstene.
5. 17β-hydoxy-17α-methyl-9(11)-androstene.
6. 17β - hydroxy - 17α - methyl - 9(11) - androstene 17-acetate.
7. 17β - hydroxy - 17α - ethinyl - 9(11) - androstene of the following formula:

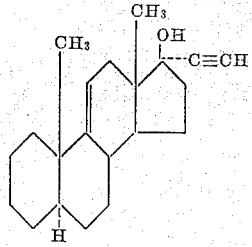

8. 9α-halo-androstane of the following formula:

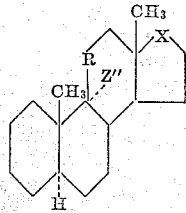

wherein R is selected from the group consisting of the carbonyl radical (>C=O) and the β-hydroxymethylene radical

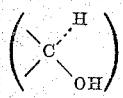

Z″ is a halogen having an atomic weight from 19 to 127, inclusive, X is selected from the group consisting of the carbonyl radical (>C=O), the β-hydroxymethylene radical

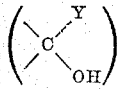

and the lower-acyloxy methylene radical

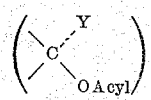

and the acyl radical is that of a hydrocarbon carboxylic acid containing from one to twelve carbon atoms, inclusive, and Y is selected from the group consisting of hydrogen and a lower hydrocarbon radical.

9. A member of the group consisting of 9α-bromo-11β,17β-dihydroxyandrostane of the following formula:

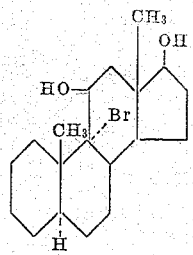

and the 17-acylates thereof wherein the acyl radical is that of a hydrocarbon carboxylic acid containing from one to twelve carbon atoms, inclusive.

10. 9α-bromo-11β,17β-dihydroxyandrostane.
11. 9α-bromo-11-keto-17β-hydroxyandrostane.
12. 9,11β-epoxy-androstane of the following formula:

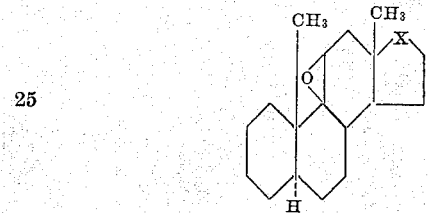

wherein X is selected from the group consisting of the carbonyl radical (>C=O), the β-hydroxymethylene radical

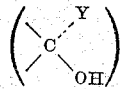

and the lower-acyloxy methylene radical

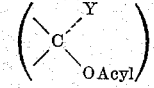

and the acyl radical is that of a hydrocarbon carboxylic acid containing from one to twelve carbon atoms, inclusive, and Y is selected from the group consisting of hydrogen and a lower hydrocarbon radical.

13. 9,11β-epoxy-17-ketoandrostane.
14. 9,11β-epoxy-17β-hydroxyandrostane.
15. 9,11β-epoxy-17β-hydroxy-17α-methylandrostane.
16. 9α-fluoro-11β,17β-dihydroxyandrostane of the following formula:

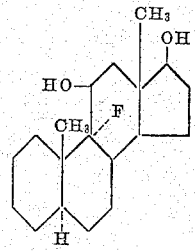

and the 17-acylates thereof wherein the acyl radical is that of a hydrocarbon carboxylic acid containing from one to twelve carbon atoms, inclusive.

17. 9α-fluoro-11β,17β-dihydroxyandrostane.
18. 9α-fluoro-11β-hydroxy-17-ketoandrostane.
19. 9α-fluoro-11,17-diketoandrostane.
20. 9α-fluoro-11β,17β - dihydroxy - 17α - methylandrostane.
21. 9α-fluoro - 11β,17β - dihydroxy-17α - methylandrostane 17-propionate.

22. A member of the group consisting of 9α-fluoro-11-keto-17β-hydroxyandrostane of the following formula:

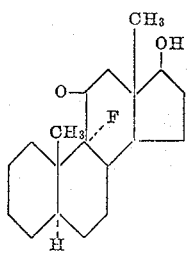

and the 17-acylates thereof wherein the acyl radical is that of a hydrocarbon carboxylic acid containing from one to twelve carbon atoms, inclusive.

23. 9α-fluoro-11 - keto - 17β - hydroxy - 17 - methylandrostane.

References Cited in the file of this patent
UNITED STATES PATENTS 2,783,253    Sondheimer et al. _____ Feb. 26, 1957

OTHER REFERENCES

Herr et al.: Journal of Amer. Chem. Soc. (1955), vol. 77, pages 488–9 relied on.